(12) United States Patent
Mincher et al.

(10) Patent No.: US 11,117,077 B2
(45) Date of Patent: Sep. 14, 2021

(54) FILTER ASSEMBLY

(71) Applicant: Parker Hannifin Manufacturing (UK) Ltd., Hemel Hempstead (GB)

(72) Inventors: Adrian Richard Mincher, South Cave (GB); Svetlana Ferrari, Huddersfield (GB); Mark Barron, Doncaster (GB)

(73) Assignee: Parker Hannifin Manufacturing (UK) Ltd., Hemel Hempstead (GB)

( * ) Notice: Subject to any disclaimer, the term of this patent is extended or adjusted under 35 U.S.C. 154(b) by 0 days.

(21) Appl. No.: 16/507,118

(22) Filed: Jul. 10, 2019

(65) Prior Publication Data

US 2019/0329164 A1    Oct. 31, 2019

Related U.S. Application Data

(63) Continuation of application No. PCT/GB2018/050180, filed on Jan. 22, 2018.

(51) Int. Cl.
*B01D 29/96* (2006.01)
*B01D 35/157* (2006.01)
(Continued)

(52) U.S. Cl.
CPC ............. *B01D 29/96* (2013.01); *B01D 29/15* (2013.01); *B01D 29/23* (2013.01);
(Continued)

(58) Field of Classification Search
CPC .... B01D 29/96; B01D 35/1573; B01D 29/15; B01D 29/23; B01D 2201/0415;
(Continued)

(56) References Cited

U.S. PATENT DOCUMENTS 5,744,030 A    4/1998 Reid
6,554,139 B1   4/2003 Maxwell
(Continued)

FOREIGN PATENT DOCUMENTS

CN    201613087 U    10/2010
EP    0 887 100 A1   12/1998
(Continued)

OTHER PUBLICATIONS

Search Report for GB1701108.1 dated Jul. 25, 2017.
(Continued)

*Primary Examiner* — Madeline Gonzalez
(74) *Attorney, Agent, or Firm* — Christopher H. Hunter

(57) ABSTRACT

A filter assembly includes a filter element, and a mount having at least one port, each of the filter element and mount having inter-engaging connection formations where the filter element and mount can be detachably connected to one another, with the mount defining a flow path for fluid to flow between the port and the filter element. The mount includes a valve with a valve member which can move between an open position and a closed position. One of the filter element and the mount has at least one lug and the other of the filter element and mount has a ramp surface, the lug engaging the ramp surface when the filter element and mount are brought together along an axis and a cam action between the lug and the ramp surface causes axial movement of the valve member when the filter element is then rotated relative to the mount.

27 Claims, 3 Drawing Sheets

(51) Int. Cl.
  *B01D 29/15* (2006.01)
  *B01D 29/23* (2006.01)
(52) U.S. Cl.
  CPC .. *B01D 35/1573* (2013.01); *B01D 2201/0415* (2013.01); *B01D 2201/291* (2013.01); *B01D 2201/347* (2013.01); *B01D 2201/4007* (2013.01); *B01D 2201/4053* (2013.01); *B01D 2201/4061* (2013.01); *B01D 2201/4092* (2013.01)
(58) Field of Classification Search
  CPC ...... B01D 2201/4053; B01D 2201/347; B01D 2201/4007; B01D 2201/4092; B01D 2201/4061; B01D 2201/291; B01D 2201/316; B01D 29/21; B01D 2201/4046; B01D 35/153; B01D 27/08; B01D 35/30; B01D 2201/29; B01D 2201/30; B01D 2201/40; B01D 35/306; B01D 2201/4023
  USPC ................ 210/234–236, 282, 442, 444, 455
  See application file for complete search history.

(56) References Cited

U.S. PATENT DOCUMENTS

| | | | |
|---|---|---|---|
| 6,723,239 B2 | 4/2004 | Maxwell | |
| 6,746,600 B2 | 6/2004 | Nguyen | |
| 6,911,143 B2 | 6/2005 | Janik | |
| 7,135,113 B2 | 11/2006 | Bassett | |
| 7,413,089 B1 * | 8/2008 | Tidwell | B01D 27/06 210/443 |
| 7,531,090 B1 | 5/2009 | Stamey | |
| 7,850,755 B2 | 12/2010 | Krull | |
| 8,231,793 B2 * | 7/2012 | Hacker et al. | B01D 35/153 210/767 |
| 8,425,773 B2 | 4/2013 | Bonta | |
| 9,212,576 B2 | 12/2015 | Hirsch | |
| 2001/0030148 A1 | 10/2001 | Knight | |
| 2004/0232064 A1 | 11/2004 | Wilkinson | |
| 2006/0096934 A1 | 5/2006 | Weinberger | |
| 2006/0254971 A1 | 11/2006 | Tubby | |
| 2007/0000830 A1 | 1/2007 | Snider | |
| 2007/0084432 A1 | 4/2007 | Jensen | |
| 2008/0053884 A1 | 3/2008 | Marshall | |
| 2008/0053886 A1 | 3/2008 | Marshall | |
| 2009/0008317 A1 | 1/2009 | Mules | |
| 2009/0090668 A1 * | 4/2009 | Abdalla | B01D 35/153 210/437 |
| 2010/0224539 A1 | 9/2010 | Luther | |
| 2013/0228504 A1 | 9/2013 | McElroy | |
| 2014/0190880 A1 | 7/2014 | Krull | |
| 2014/0366494 A1 | 12/2014 | Ardes | |
| 2015/0090653 A1 | 4/2015 | Kotale | |

FOREIGN PATENT DOCUMENTS

| | | |
|---|---|---|
| KR | 100 944 226 B1 | 2/2010 |
| KR | 2012 0038297 A | 4/2012 |
| WO | 0180967 A1 | 11/2001 |
| WO | 2015156760 A1 | 10/2015 |

OTHER PUBLICATIONS

Search Report for GB1701108.1 dated Oct. 19, 2017.
International Search Report and Written Opinion for PCT/GB2018/050181 dated May 7, 2018.
Written Opinion for PCT/GB2018/050181 dated Jan. 16, 2019.
Search Report for GB1701107.3 dated Jul. 21, 2017.
Search Report for GB1701107.3 dated Oct. 17, 2017.
Partial International Search Report for PCT/GB2018/050180 dated Apr. 26, 2018.
International Search Report and Written Opinion for PCT/GB2018/050180 dated Aug, 207, 2018.

\* cited by examiner

FILTER ASSEMBLY

This application is a continuation application pursuant to 35 U.S.C. § 120 of PCT/GB2018/050180 filed on Jan. 22, 2018 which claims the benefit of G.B Application No. 1701107.3 filed Jan. 23, 2017, the disclosures of which are incorporated herein by reference.

FIELD OF THE INVENTION

This invention relates to a filter assembly which includes a filter element. The filter assembly can be used to remove contaminants from a fluid, especially particulate contaminants. The fluid can be a liquid or a gas.

BACKGROUND

Filters which are used to remove contaminants from a fluid frequently include a filter element which is mounted in a housing. The filter element includes a filter media. The fluid flows through the filter media. The housing includes an inlet through which the fluid is supplied to the filter element, and an outlet through which the fluid can be discharged from the filter after it has been filtered by flowing through the filter media. The material of the filter media is selected according to the nature of the fluid, the nature of the contaminants, and the operating conditions of the filter.

A filter can include multiple elements which are arranged to filter a fluid sequentially. One or both of the elements can be hollow in which the filter media defines a cavity so that the fluid passes through the wall which defines the cavity. When the filter includes multiple elements, the wall of the cavity can be regarded as being provided by a filter element which then receives a further filter element.

It is common for the filter element to be capable of being removed from the housing for replacement, in particular when its capacity to absorb contaminants is limited. It is important for efficient operation of the filter that seals are created reliably between corresponding surfaces of the filter element and the housing to ensure that the fluid which is to be filtered is not able to flow between the inlet and outlet in the housing without having to flow through the filter media.

It can be desirable to restrict flow of fluid between the filter element and the housing when the element is not properly seated in and sealed to the housing.

SUMMARY

A filter assembly is provided in which a mount includes a valve member which can be made to move axially when a filter element is rotated relative the mount, causing the valve member to move from a closed position in which fluid is at least partially prevented from flowing along a flow path between the mount and the filter element and an open position in which fluid can flow along the flow path.

A filter assembly is therefore provided which comprises a filter element for filtering a fluid, and a mount having at least one port, each of the filter element and the mount having inter-engaging connection formations by which the filter element and the mount can be detachably connected to one another, and the mount defining a flow path for fluid to flow between the port and the filter element when the filter element is connected to the mount,
  a. in which the mount includes a valve for controlling flow of fluid along the flow path, the valve including a valve member which can move between an open position in which fluid can flow along the flow path and a closed position in which the valve at least partially prevents flow of fluid along the flow path,
  b. and in which one of the filter element and the mount has at least one lug and the other of the filter element and the mount has a ramp surface, the lug engaging the ramp surface when the filter element and the mount are brought together along an assembly axis and a cam action between the lug and the ramp surface causing axial movement of the valve member when the filter element is then rotated relative to the mount.

The filter assembly has the advantage that fluid flow between the mount and the filter element is prevented by the closed valve in the mount from flowing between the mount and the filter element unless the filter element and the mount have been assembled together properly. This can help to reduce the likelihood of loss of fluid when a filter element is not properly in place.

The engagement of the lug and ramp surface can also be used to reduce the likelihood of an incorrect filter element being fitting on a mount by an appropriate arrangement of mating features on the filter element and the mount such that the valve member can only be made to move axially when the filter element that is assembled with the mount has the correct arrangement of mating features.

The filter element and the mount may be arranged so that they are brought together by moving the filter element relative to the mount in a first direction along the assembly axis. The lug and the ramp surface may be arranged so that the valve member moves from the closed position to the open position in a second direction along the assembly axis. The second direction may be opposite to the first direction. In use, the filter element may be moved in the first direction, towards the mount, to bring the filter element and the mount together. The cam action may then cause the valve member to be moved in the second direction, away from the mount, to the open position.

Opening of the valve may be achieved by causing the valve member to move axially away from the mount.

At least part of the ramp surface may extend approximately helically around the one of the filter element and the mount which has the ramp surface. The valve member may be moved by rotating the filter element relative to the mount while the lug is engaged with the ramp surface. A shape of the ramp surface may cause the lug to be drawn along the assembly axis.

Optionally, the valve member is tubular and the valve includes a further member which will frequently also be tubular, the tubular valve member and the further member being arranged coaxially so that one can slide relative to the other and each of the valve member and the further member having at least one hole in its wall, and in which the hole in the wall of the valve member overlaps the hole in the wall of the further member when the valve is open. It will often be preferred that one of the valve member and the further member slides axially relative to the other, although it is envisaged that one of the said members might twist about its axis relative to the other, instead of or in combination with a sliding movement. The further member can be provided radially inside the valve member. It can then provide the core of the assembly. A further member which provides the core of the assembly (when it might be a core tube) can have other components within it, for example a tube through which gaseous contaminants which are collected from the process fluid can be discharged. Process fluid which has flowed through a valve provided by the valve member and a core tube can flow towards an outlet for the process fluid through the core tube.

When the further member is tubular, it should be configured so that there is no flow path for process fluid to flow into (or out of it, depending on the direction of flow of the process fluid when the assembly is in use) it other than through the hole in its wall. A tubular further member can be closed at one end to prevent such flow and open at its other end to provide a flow path for the process fluid.

Optionally, the further member is fixed against movement relative to the mount when the valve member moves between its open and closed positions. The further member can be fixed to the mount so that it cannot be readily separated from the mount. For example, the further member might be formed as a part of the mount, or it might be bonded to the mount for example by welding or by means of an adhesive. It will often be preferred that the further member is capable of being separated from the mount. For example, it might be fastened to the mount by means of cooperating threads on the further member and the housing base. The connection between the mount and the further member will frequently be sealed so that fluid cannot flow out of the mount at the connection between the mount and the further member (when the further member is tubular), other than through the further member.

The lug can be provided on the mount and the ramp surface can be provided on the filter element. It is also envisaged that the lug can be provided on the filter element and the ramp surface can be provided on the mount.

It will often be preferred that more than one lug is provided for engaging the ramp surface. When two or more lugs are provided, the lugs can be spaced apart around the assembly axis. The lugs can be spaced apart equally around the assembly axis. This can facilitate assembly of the filter element and the mount. The spacing of lugs around the assembly axis can be unequal so that assembly of the element and the mount requires a specific initial rotational orientation of the element relative to the mount. This can help to ensure that the filter element that is assembled with a mount is the appropriate element.

The ramp surface will generally be a surface which faces in the same axial direction as the direction in which the filter element is moved towards the mount when the two are moved together during assembly. The ramp surface can be provided on a flange. When the ramp surface is provided on a flange, an opening can be formed in the flange to allow the lug to be moved through the flange so that it can act on the ramp surface. When there are two or more lugs, there will normally be a corresponding number of openings in the flange. The sizes and relative locations of the openings should correspond to the sizes and locations of the lugs. Matching the sizes and locations of the or each lug and the corresponding openings in a flange can be relied on to ensure that the filter element which is assembled with a particular mount is the appropriate element.

When two or more lugs are provided, they can be provided at different points along the assembly axis so that they can cooperate with a continuous ramp surface. It is also envisaged that lugs might be provided at the same point along the assembly axis and that separate ramp surfaces are provided to engage respective ones of the lugs.

The filter element and the mount will generally have cooperating sealing surfaces. Optionally, the sealing surface on the mount can be provided on a part of the mount which can move relative to the base into sealing engagement with the sealing surface on the filter element when the valve member is made to move by the cam action between the lug and the ramp surface from its closed position towards its open position. This can lead to a fluid tight seal being formed between the filter element and the mount as part of the same operation to open the valve to allow fluid to flow between the filter element and the mount.

Also provided is a filter assembly which comprises a filter element for filtering fluid, and a mount having at least one port, each of the filter element and the mount having inter-engaging connection formations by which the filter element and the mount can be detachably connected to one another, and the mount defining a flow path for fluid to flow between the port and the filter element when the filter element is connected to the mount, a. in which the filter element and the mount have cooperating sealing surfaces, the sealing surface on the mount being provided on a sealing part of the mount which can move into sealing engagement with the sealing surface on the filter element,
 b. and in which one of the filter element and the mount has at least one lug and the other of the filter element and the mount has a ramp surface, the lug engaging the ramp surface when the filter element and the mount are brought together along an assembly axis and a cam action between the lug and the ramp surface causing axial movement of the movable sealing part of the mount when the filter element is then rotated relative to the mount, to cause a seal to be made between the sealing surfaces.

Optionally, the mount includes a deformable sealing member which provides a seal between the base and the movable sealing part.

Optionally, the mount includes a valve for controlling flow of fluid along the flow path, the valve including a valve member which can move between an open position in which fluid can flow along the flow path and a closed position in which the valve at least partially prevents flow of fluid along the flow path.

Optionally, the valve member can move relative to the base between its open and closed positions when the movable sealing part is moved into sealing engagement with the sealing surface on the filter element.

Optionally, the sealing surface on the filter element is provided by a deformable sealing member. The sealing member can comprise an O-ring. The sealing member on the filter element can be located in a groove on the filter element which retains the sealing member in place.

Optionally, at least one of the mount and the movable sealing part can include a deformable sealing member which provides a seal between the mount and the movable sealing part. The deformable sealing member can be located in a groove. It can be provided on the mount or on the movable sealing part.

Optionally, the valve member and the movable sealing part can be connected to one another. Optionally, the connection between the valve member and the movable sealing part is such that the valve member and the movable sealing part can be detached from one another. A connection between the valve member and the movable sealing part can ensure that a seal is formed between the sealing surfaces on the filter element and the mount when the valve member moves to open the valve. A detachable connection allows the valve member to be separated from the movable sealing part, for example for servicing or for replacement.

A detachable connection might be provided by providing one of the valve member and the movable sealing part with a flexible tang with a barb towards one end, and the other of the valve member and the movable sealing part with a recess in which the barbed end of the flexible tang can be received to connect the valve member and the movable sealing part to one another. The connection might be provided by a plurality of such tangs and recesses. The valve member and the movable sealing part can be separated from one another by deforming the tangs so that the barbs are released from the recess or recesses. It will generally be preferred that the tangs are provided on the valve member for ease of maintenance.

It can be preferred that the valve member is biased towards its closed position. This can be achieved by means of a spring, especially a helical spring, which is incorporated in the mount.

The mount can form part of a housing for the filter element. The housing can include a housing body which, when the housing body is engaged with the mount, encloses the filter element. The housing body can be a hollow canister which the filter element can be fitted into. The housing body can define an annular space between the media material of the filter element and the inside wall of the housing body for a process fluid. Fluid in the annular space will be filtered fluid which can be supplied to a downstream application when the filter operates in an inside-to-outside mode. Fluid in the annular space will be intended to flow through the filter media for filtration prior to being supplied to a downstream application when the filter operates in an outside-to-inside mode. A filter assembly can include a housing body in the form of an open-ended canister, and a seal component which can be fitted between the edge which defines the open end of the canister and the surface of the mount so that a seal is formed between the canister and the surface of the mount when the two are urged together.

The mount can be provided within a housing body, for example in the base of a housing body. The mount can provide the base for a housing. The housing body can be open at its end opposite to the base to allow access to the space within the housing in order to fit and/or to remove a filter element. The housing can include a lid which closes the housing body at its open end.

The mount can define a flow path for fluid to flow between the mount and the filter element through the port in the mount, when the filter element is connected to the mount. The mount will usually include two ports, with one port provided for fluid to flow into the filter element to pass through the filter media and the other port provided for fluid to flow out of the filter element after it has passed through the filter media. Both ports can be provided in the mount. In this case, the mount will define flow paths for fluid to flow from a first port to the filter element for filtration, and to the second port from the filter element after it has been filtered. One of the flow paths will generally extend between a port and an annular space around the filter media, and the other of the flow paths will then extend between a port and the hollow space within the filter element which is defined by the filter media. Designs of filter housings which incorporate these features are well known.

The filter element can include a cylindrical wall of a filter media which is arranged so that the fluid which is to be filtered flows through the wall between a first port which communicates with the valve in the mount and the central axial cavity within the filter element and a second port which communicates with the circumferential space around the outside of the element. The second port will frequently be at or adjacent to an end of the filter element. The second port can be at or adjacent to the same end of the filter element as the first port. The second port can be at or adjacent to the opposite end of the filter element from the first port.

The filter assembly can be designed to operate with the fluid to be filtered flowing through the wall of the filter element from the inside to the outside. The filter assembly can be designed to operate with the fluid to be filtered flowing through the wall of the filter element from the outside to the inside.

The material for the media in the filter element will be selected according to the fluid which is to be filtered and the nature of contaminants that are to be separated from the fluid. The fluid might be a gas or a liquid. The contaminants might be solid or liquid (especially when the fluid is a gas). Features of filter elements which can be incorporated in the element used in the assembly of the invention are known from existing filter elements for various applications.

The material of the filter media is selected according to the intended application for the filter. The filter might be used to filter a pressurised gas, such as for example compressed air. The filter might remove particulate contaminants from the gas including aerosol droplets. The filter might be used to filter a liquid. The filter can remove solid particles from the liquid. The filter can be used to separate an immiscible liquid contaminant from a process liquid, for example to remove water from a hydrocarbon fuel. Examples of materials for the filter media include open cell foam materials, paper or other cellulosic materials, materials made from non-woven fibres, such as for example melt blown fibres, which might be made from polymers such as polyesters and polyam ides.

The filter element can include a support for the filter media so that the filter media can withstand pressure that is applied to it by a process fluid which is flowing towards and through the wall of the filter element. A support will generally have holes in it so that it provides little or no resistance to flow of the process fluid. The support will usually be located on the downstream side of the filter media. For example, if the filter element has a cylindrical wall with the process fluid arranged to flow through the wall from outside to inside, a support element can be provided on the inside of the filter media.

The filter assembly can include a filter mesh component in addition to a filter media component. A filter mesh can be used to separate droplets of a liquid contaminant which is entrained in a process fluid but immiscible with the process fluid. For example, when the process fluid is a hydrocarbon liquid, a filter mesh can be used to cause separation of droplets of aqueous contaminants from the hydrocarbon liquid. A filter mesh will generally be located downstream of other filter media layers such as a paper filter layer and/or a layer of a coalescing foam. A filter mesh should preferably be non-wetting in relation to liquid contaminants. For example, when the contaminants are aqueous, the filter mesh should be hydrophobic. The material of the filter mesh can be hydrophobic, or it can have a coating to render it hydrophobic. A filter mesh can include a mechanical support to help it to withstand forces resulting from the flow of the process fluid through the mesh. Appropriate materials and constructions for a filter mesh which is used in filter elements in this way are known.

The filter element can include an end fitting. Frequently a filter element will have an end fitting at each of two opposite ends. The end fittings can be configured to engage with fittings on a mount on which the element is to be used. For example, an end fitting can be configured to engage with valve features on a mount. An end fitting can be configured to engage with features at an end of a filter housing opposite to its base on which a mount is provided. An end fitting can be configured to engage with features of a filter housing at an end at which the filter housing can be opened to enable the element to be inserted into the housing. An end fitting can have an opening extending through it which communicates with a hollow space within the element. This can be particularly appropriate for an end fitting which is intended to engage with valve features in a mount, allowing fluid within the filter element to flow between the filter element and the valve in the mount. An end fitting which is configured to engage with features at an end of a filter housing opposite to its base can be a cap which closes the filter element to flow of fluid into or from a cavity within the filter element.

The end fitting can be an end cap of the filter element. The end fitting can include one or more axially facing grooves in which an axially facing edge of the filter media is received. The filter element might include a support layer for the filter media, for example in the form of a perforated plate. A perforated plate can help to separate contaminants from a fluid stream. The support layer, and possibly other layer components, can also be received in the axially facing groove in the end fitting. An end fitting can include more than one axially facing groove. Component layers (filter media (including coalescer), supports etc.) of a filter element can be distributed between respective grooves. The edges of component layers can be fastened within the grooves provided in the end fittings by means of a material other than the materials of the component layers of the filter element and of the end fitting, for example by means of an adhesive material. The edges of component layers can be fastened within the grooves provided in the end fittings without use of a material other than the materials of the component layers and of the end fitting, for example by a welding technique in which the materials of one or both of the component layer(s) and the end fitting (especially the material of the end fitting) is made to melt. This might be achieved by exposure to infrared radiation. Appropriate fastening techniques are known for use in the construction of filter elements.

An end fitting can be formed from a polymeric material by moulding. Materials which can be used in this way in the manufacture of filter element end fittings are known. The selection of a suitable material will depend on the application for the filter element including for example the materials to which it will be exposed when in use and the conditions (for example temperature and differential pressure across the element). Filter media layer components can be fastened within an axially facing groove in an end fitting using an adhesive material, or by use of a welding technique.

Features of a filter element, and of a filter assembly in which the element can be used, are disclosed in UK patent application no. 1701105.7 filed on 23 Jan. 2017, and an International patent application filed with the present application, with the title "A Filter Element", having agents' references SJB/P236217 and RXO/P236217WO. Features of the filter element which are disclosed in that application are incorporated in this application by this reference.

The features on the filter element which engage with the mount can be provided on the end fitting. These can include for example whichever of the lug and the ramp surface is provided on the filter element. These can also include the connection formations on the filter element which engage connection formations on the mount to connect the filter element to the mount, where these are different from and in addition to the lug and the ramp surface. The end fitting can be formed from a polymeric material, for example by moulding. It might be preferred to use metallic materials for an end fitting for some applications. The choice of material for the end fitting will depend on the application for the filter element including for example the materials to which it will be exposed when in use and the conditions (for example temperature and differential pressure across the element). Examples of suitable polymeric materials can include polyolefins, polyesters, polyamides. Polymeric materials used to form the end fitting might be reinforced by means of fibres. Filter media can be fastened within an axially facing groove in an end fitting using an adhesive material, as is known.

The filter assembly can include more than one filter element. For example, the assembly can include an outer filter element which has a cylindrical wall defining a hollow space within it. The assembly can include an inner filter element which is positioned in the hollow space within the outer filter element. A process fluid can pass sequentially through the elements, either outwardly or inwardly. A filter housing for inner and outer elements can include a cylindrical partition between the elements so that a fluid that has flowed through a first one of the elements can be collected and subjected to an intermediate process before being supplied to the second one of the elements. For example, the process fluid might pass through a pump after passing through the first one of the elements and before passing through the second one of the elements. The assembly can provide appropriate flow paths for the process fluid to flow along.

The material from which a housing is made will be selected according to the conditions and materials to which the filter will be exposed when in use. It can be preferred to make the housing from a polymeric material for some applications. Use of a polymeric material can have the advantage of light weight and ease of manufacture by a moulding process. Examples of suitable polymeric materials include polyolefins, polyamides, polyesters. A polymeric material which is used to make the housing can be reinforced with fibres. It can be preferred to make the housing from a metal. Use of a metal can have the advantage that the housing is resistant to damage, for example due to impact. Examples of metals which can be used to make the housing include steels, and aluminium and its alloys. When the first part of the end fitting is a cap, it can be made from the same material as the housing.

Suitable materials for O-rings used in the filter assembly are known from existing filters. They can include certain rubbers, including for example acrylonitrile butadiene rubbers (NBRs), ethylene propylene diene monomer (EPDM) rubbers, silicone rubbers, fluorosilicone rubbers, and thermoplastic elastomers.

In filter assemblies as presented in this document, the housing can have an open end through which the filter element can be positioned in the cavity within the housing. The formations on the element by which it and the housing are connected to one another can be provided at the open end of the housing. The housing can be arranged in use so that its open end is an upper end. The housing can be arranged in use so that its open end is a lower end.

When the housing is open at one end to allow the filter element to be positioned within the housing, connections between the filter element and ports for the process fluid can be made at the open end of the housing.

BRIEF DESCRIPTION OF THE DRAWINGS

Filter assemblies and components thereof are described below by way of example with reference to the accompanying drawings, in which.

DETAILED DESCRIPTION

Figure 1:
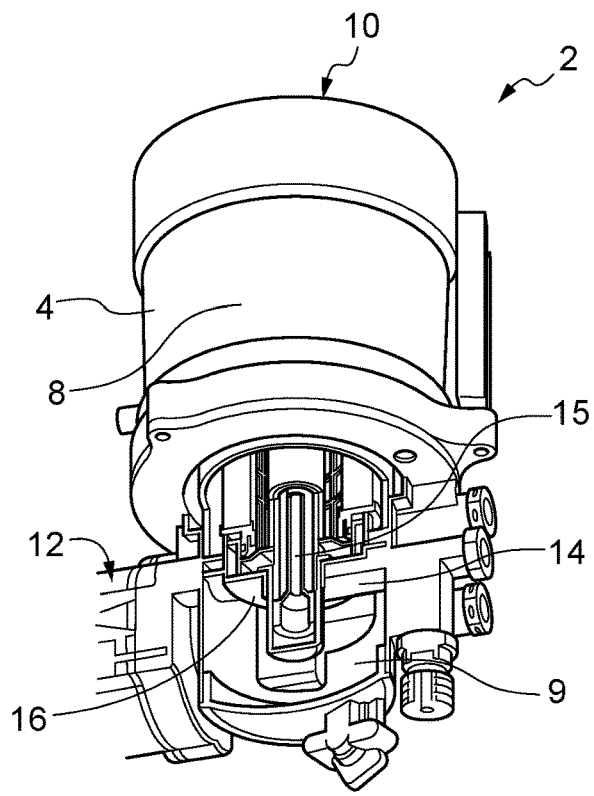
FIG. 1 is an isometric view, partially in section, of a typical filter assembly which includes a filter element, and a housing in which the filter element is arranged.

Referring to the drawings, FIG. 1 shows a filter assembly 2 which can be used to treat a process fluid by removing contaminants from the fluid. The fluid might be a liquid or a gas. The contaminants can include particulate solid materials. The contaminants can include droplets of a liquid which is immiscible with a process liquid. For example, the filter assembly can be used to remove aqueous contaminants from a hydrocarbon fuel.

The filter assembly 2 includes a housing 4. The housing has a cylindrical upper body 8 which is open at its upper end. The assembly includes a housing lid 10 which closes the upper body at its open end. The housing has a lower body 9 which includes ports for connecting the filter assembly to other components such as pumps, fluid sources, and downstream fluid consumers. In the construction shown in FIG. 1, a pump 12 is connected to the lower body 9. The pump can be used to make the process fluid flow through the filter assembly.

The housing lid 10 can be separated from the housing upper body 8 to allow a filter element to be positioned within the housing. The housing body has a mount 14 provided on a base wall 16 which separates the housing upper body 8 from the housing lower body 9. A filter element for use in the housing is lowered towards the mount. A port 15 is provided on the base wall which allows the process fluid to flow between a hollow central cavity within the element and a port on the housing body when the filter element is properly installed within the housing. The lower part of the housing can include features for collecting and discharging collected liquid contaminant.

Figure 2:
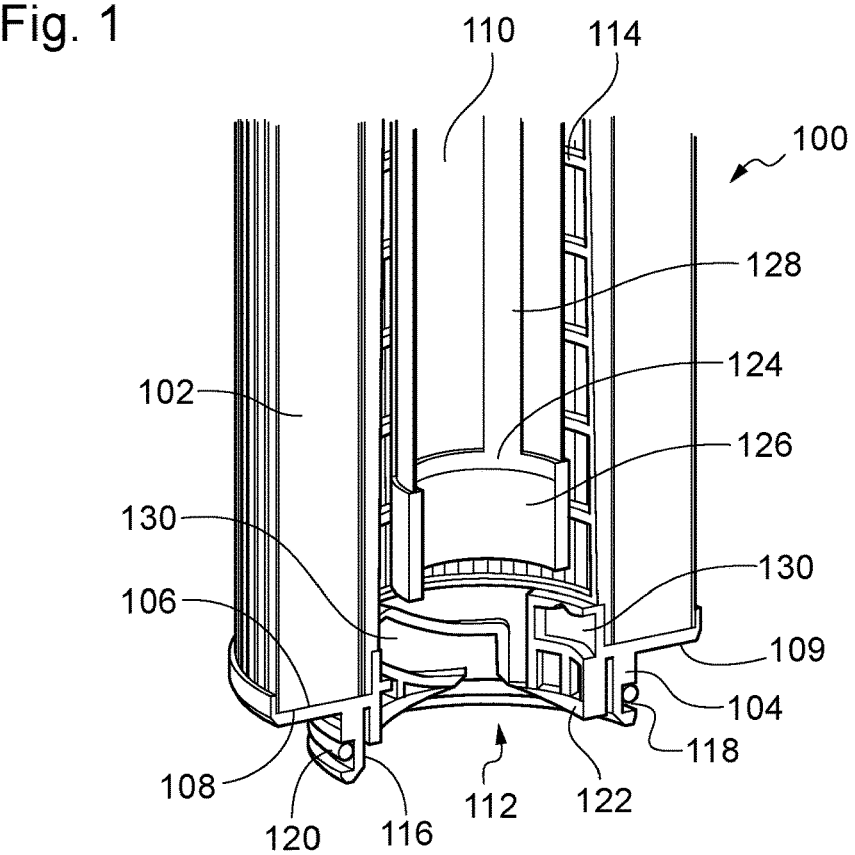
FIG. 2 is an isometric view, partially in section, showing the lower end fitting of a filter element which can be fitted in a housing of a filter assembly.

FIG. 2 shows a lower portion of a filter element 100 which can be used in a filter housing of the kind shown in FIG. 1. The filter element 100 has a cylindrical wall 102 which is formed from one or more appropriate filter media materials. The filter element has a top end fitting (not shown) and a bottom end fitting 104. Each of the end fittings has a groove formed in it in which an end face 106 of the cylindrical wall 102 is received. The groove in the top end fitting faces downwardly, towards the bottom end fitting. The groove 108 in the bottom end fitting is provided in a transverse plate 109 and faces upwardly, towards the top end fitting. The cylindrical wall defines a cavity 110 within the filter element. The cavity is closed at its upper end by the top end fitting. The cavity can be accessed at its lower end through a central opening 112 in the bottom end fitting.

The top end fitting of the filter element will have features which ensure that it fits securely within the housing body. The top end fitting will frequently have a radially outwardly facing groove formed in its outer surface which can receive an O-ring seal. This can form a seal between the top end fitting and the inner surface of the cylindrical wall of the housing upper body 8. Such filter element end fittings are known.

The material of the filter media which provides the wall 102 of the filter element is selected according to the nature of the fluid, the nature of the contaminants, and the operating conditions of the filter. It will frequently be appropriate to provide more than one filter media in the wall of the element. For example, the element wall can include a layer which is formed from a paper-based material, for example by pleating. A paper filter media which is to be used to remove aqueous contaminants from an organic liquid such as a hydrocarbon fuel can be coated with a hydrophobic material which can help to separate the contaminants from the organic liquid. The element wall can include a layer of an open cell foam. Such a foam layer can cause droplets of a liquid contaminant in the process fluid to coalesce. The filter media can include a mesh. A mesh layer which is to be used to remove aqueous contaminants from an organic liquid such as a hydrocarbon fuel can be coated with a hydrophobic material which can help to separate the contaminants from the organic liquid. Factors affecting the selection of appropriate filter media for use in such filter elements are well understood.

The filter element can include a foraminous support component 114 located in contact with the internal surface of the cylindrical wall 102 which is provided by the filter media material (or materials). The support component is located inside the cylindrical wall of the filter media materials so that it can support the filter media materials against forces arising from the flow of the process fluid through the filter media materials in an outside-to-inside direction through the cylindrical wall to the cavity 110 within the element, for discharge from the element through the opening 112 in the bottom end fitting. A support component should be located outside the wall provided by the filter media materials when the process fluid flows in an inside-to-outside direction. A support component should have holes formed in it so that it provides little or no resistance to flow through it of the process fluid. The holes should not be so big that they compromise the ability of the support component to support the filter media materials. A support component can be made from a polymeric material such as a polyolefin or a polyester or a polyamide, or from a metallic material. A support component can be made from a polymeric material conveniently by moulding.

The filter element includes a filter mesh component 124 which is located inside the foraminous support component 114. The filter mesh component includes a continuous collar 126 at its lower end adjacent to the opening 112 in the bottom end fitting. The mesh is reinforced by means of a plurality of axially extending flexible webs 128. The filter mesh component can include a polyester mesh. The mesh material is hydrophobic so that it is not wetted by aqueous liquid contaminants in a hydrocarbon process fluid.

The bottom end fitting 104 of the filter element has a downwardly extending flange 116 which surrounds the opening 112 which has a radially outwardly facing groove 118 formed in its outer surface. An O-ring 120 is provided in the groove 118.

The bottom end fitting 104 has an inward facing wall 122 which defines the opening 112. Three pairs of ribs are provided on the wall which define respective ramp channels 130 which are open at the bottom edge of the wall and extend approximately helically from the bottom edge. Parts of two of the ramp channels are visible in FIG. 2. The ramp channels are spaced apart equally around the opening in the bottom end fitting.

Figure 3:
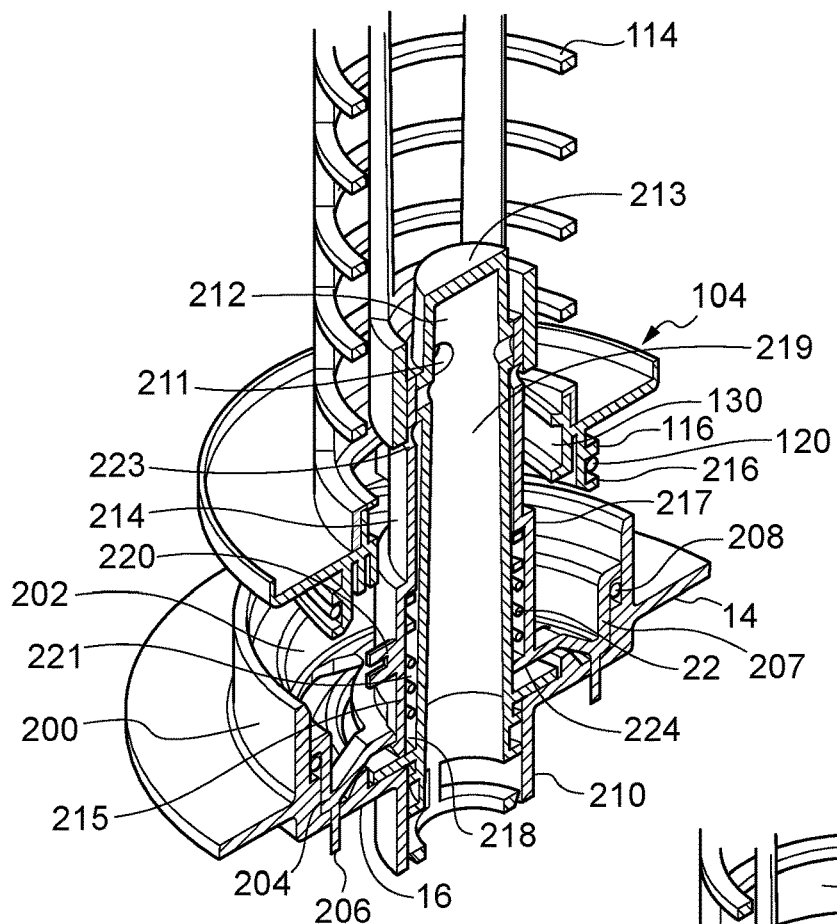
FIG. 3 is an isometric view, partially in section, showing features of the filter element and a port on the housing, with the filter element and the port aligned so that they can be connected to one another, prior to forming the connection between them.
Figure 4:
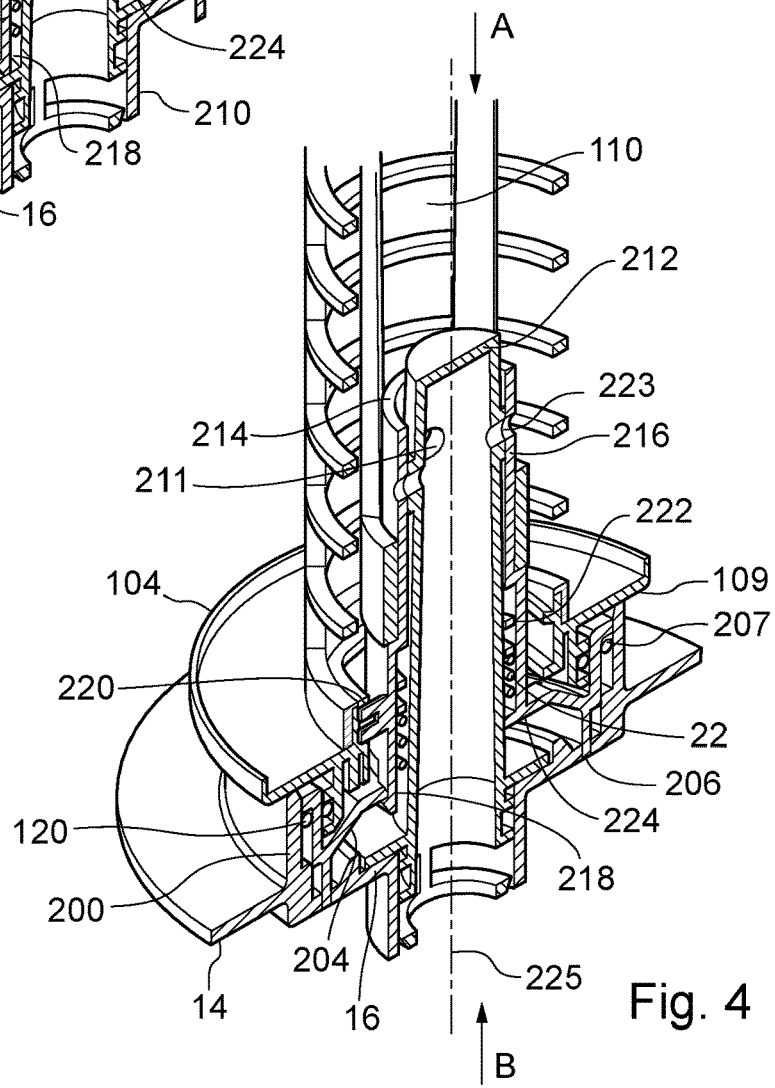
FIG. 4 is an isometric view, partially in section, showing the features of the filter element and of the port on the housing which are shown in FIG. 3 once they have been connected to one another.
Figure 5:
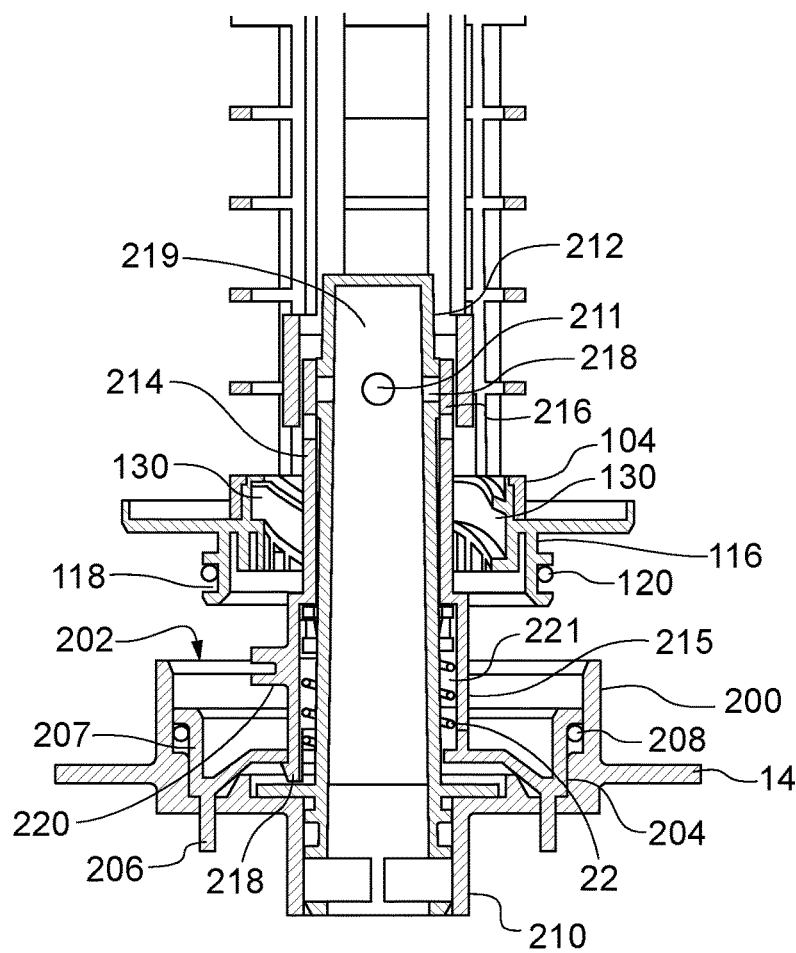
FIG. 5 is a sectional elevation view of the filter element and the housing port as shown in FIG. 3.

Features of the mount 14 on the base wall 16 of the housing body can be seen in FIGS. 3 to 6, in particular FIGS. 3 and 5 which show features of the filter element and the mount when the element and the mount are aligned with one another but not connected to one another. Some features of the filter element and of the housing are omitted for clarity. For example, the wall of the filter element which is provided by the filter media is omitted. Features of the housing body other than the mount are also omitted.

The mount 14 has an upwardly extending flange 200 which defines an upwardly facing socket 202 in which the downwardly extending flange 116 on the bottom end fitting 104 of the filter element can be received.

A seal plate 204 is located within the socket 202. The seal plate can slide axially within the socket. The seal plate has a plurality of downward extensions 206 which fit in corresponding openings in the base wall 16 to guide the seal plate as it slides relative to the base wall. The seal plate has a cylindrical wall 207 which extends parallel to the axis of the assembly, and parallel to the upwardly extending flange 200 which defines the socket 202. The internal surface of the cylindrical wall 207 provides a sealing surface. The cylindrical wall 207 has a radially outwardly facing groove formed in it. An O-ring 208 is located in the groove which forms a seal between the seal plate and the radially inwardly facing surface of the flange 200 which defines the socket as the seal plate slides within the socket.

The mount 14 has a central downwardly extending flange 210 whose diameter is smaller than that of the upwardly extending flange 200 which defines the socket 202. A core tube 212 is fastened to the inner wall of the downwardly extending flange 116 on the mount and extends upwardly from the downwardly extending flange through the socket 202. The core tube has a plurality of flow channels 211 extending through its wall, communicating with a cavity 219 within the core tube. For example, the core tube can have four flow channels spaced apart equally around the axis of the core tube. The core tube is closed at its free end 213.

A tubular valve member 214 is fitted so that it can slide on the core tube. The valve member has a top segment 216 which is a close sliding fit on the core tube. A plurality of flow channels 223 are provided in the top segment of the valve member, extending through its wall. For example, when the core tube has four flow channels extending through its wall, the valve member will normally also can have four flow channels.

The valve member 214 has a bottom segment 215 whose diameter is greater than that of the top segment. An annular chamber 221 is defined between the internal surface of the bottom segment of the valve member and the external surface of the core tube.

The bottom segment of the valve member has a plurality of latch fingers 218 (for example three latch fingers) at its bottom edge. The latch fingers can flex radially inwardly. Each of them has a projection which faces radially outwardly at its free end. The latch fingers can be inserted through aligned openings in the seal plate. The latch fingers deform inwardly as they are inserted and then spring outwardly. The projections on the latch fingers prevent the fingers from being pulled out of the openings in the seal plate. The latch fingers can therefore ensure that a downwardly directed force applied to the seal plate is transmitted to the valve member and that an upwardly directed force applied to the valve member is transmitted to the seal plate.

The valve member has a plurality of radially outwardly extending lugs 220 (for example three lugs) on the external surface of the bottom segment.

A helical spring 22 is provided in the annular chamber 221 between the bottom portion of the valve member and the core tube. It acts between a locating ring 222 which is fastened to the core tube and the radially inward most edge 224 of the seal plate 204.

FIGS. 3 and 5 show the filter element 100 aligned with the port 15 in the base wall 14 of the housing upper body 8 for assembly, but without them being connected to one another. The seal plate 204 is acted on by the spring 22 in the annular chamber 221 between the internal surface of the bottom segment of the valve member and the external surface of the core tube, so that the seal plate is in contact with the base wall of the mount within the socket 202. The engagement between the latch fingers 218 on the valve member 214 and the holes in the seal plate ensure that it is also restrained against movement by the action of the spring. The relative positions of the valve member 214 and the seal plate 204 are such that the flow channels 211 in the wall of the core tube 212 do not overlap the flow channels 223 in the top segment 216 of the valve member 214. The core tube and the valve member therefore provide a valve which is closed, preventing process fluid from flowing into the space within the core tube.

When the filter element is aligned with the port in the mount 14, the free end of the core tube 212 and the valve member 214 are received in the central opening 112 in the bottom end fitting 104 of the filter element 100. The valve member is a close sliding fit within the continuous collar 126 provided by the filter mesh component 124.

Figure 6:
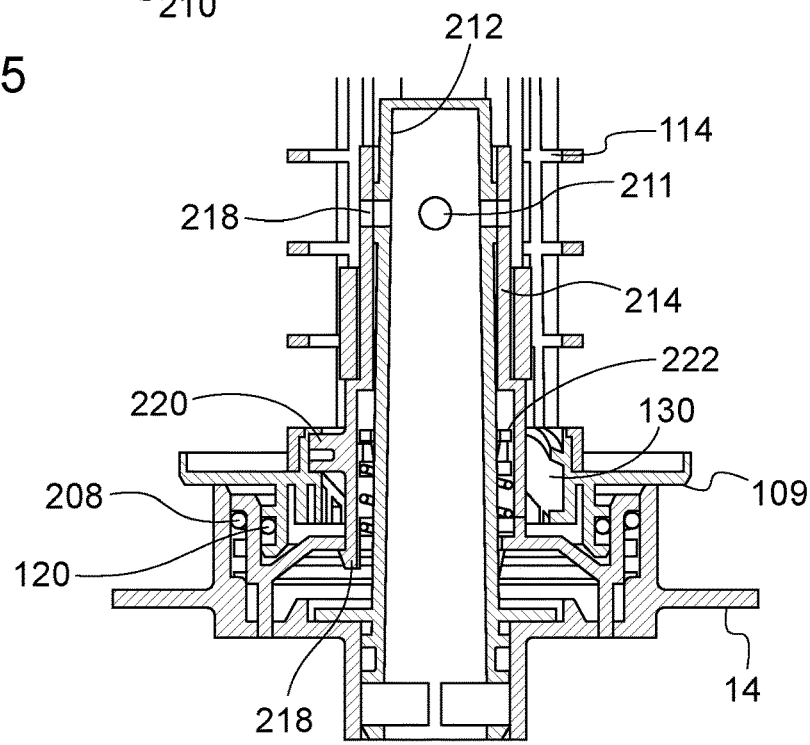
FIG. 6 is a sectional elevation view of the filter element and the housing port as shown in FIG. 4.

FIGS. 4 and 6 show the filter element 100 and the mount 14 once the filter element has been connected to the housing body. Connecting the filter element to the mount involves moving the filter element 100 relative to the mount 14 in a first direction A along an assembly axis 225 of the filter assembly, shown in FIG. 4. This is achieved by advancing the bottom end fitting 104 of the filter element into the socket 202 that is defined by the upwardly extending flange 200. At this stage, as shown in FIGS. 3 and 5, the seal plate is urged against the base wall of the mount 14. The filter element is advanced until the transverse plate 109 of the bottom end fitting 104 contacts the top edge of the upwardly extending flange 200 of the mount 14. This contact defines the in-use position of the filter element relative to the base wall of the housing body. The bottom edge of the continuous collar 126 on the filter mesh component 124 then contacts the shoulder 217 provided by the upper edge of the bottom segment of the valve sleeve, at the interface between the top and bottom segments of the valve sleeve.

At this stage in the assembly process, the seal plate is in contact with the base wall of the mount 14 because of the action of the spring 22. This means that the O-ring 120 in the groove 118 in the outer surface of the flange 116 on the bottom end fitting 104 is located above the top edge of the sealing surface provided by the cylindrical wall 207 on the sealing plate 204. There is therefore no resistance to advancing the filter element to its in use position relative to the mount 14 caused by engagement of the O-ring on the bottom end fitting flange with the seal surface on the sealing plate.

Advancing the filter element towards the mount 14 requires that the open ends of the ramp channels 130 which are defined by the ribs on the inward facing wall 122 of the bottom end fitting are aligned with the lugs 220 on the external surface of the bottom segment 215 of the valve member 214. When there are three ramp channels which are spaced equally around the axis of the assembly, and three corresponding lugs, there are three possible rotational orientations of the filter element relative to the housing body. The lugs 220 and the ramp channels 130 are arranged so that the valve member 214 moves from its closed position to its open position in a second direction B along the assembly axis 225, the second direction being opposite to the first direction A of insertion of the filter element 100. In use, the filter element 100 is moved in the first direction A, towards the mount 14, to bring the filter element and the mount together. The cam action between the lugs 220 and the channels 130 then causes the valve member 14 to be moved in the second direction B, away from the mount 14, to the open position.

Rotation of the filter element 100 relative to the mount 14, when the filter element and the mount have been brought together, causes the O-ring 120 in the groove 118 in the outer surface of the flange 116 on the bottom end fitting 104 to move from a position where it is out of sealing contact with the sealing surface provided by the cylindrical wall 207 on the sealing plate 204, to a position where it is in sealing contact.

The valve which is provided by the flow channels in the core tube and the valve member can be opened once the filter element has been advanced fully towards the mount 14.

Seals between the bottom end fitting 104 on the filter element 100 and the seal plate 204 in the socket 202 on the mount 14 can be formed once the filter element has been advanced fully towards the base wall of the housing body.

Opening the valve and making the seals can be achieved by causing the valve member 214 and the seal plate 204 to move upwardly, axially away from the base wall of the mount 14. This can be achieved by rotating the filter element relative to the housing body while the lugs 220 on the external surface of the bottom segment 215 of the valve member are received in the ramp channels 130 which are defined by opposed ramp surfaces on the ribs on the inward facing wall 122 of the bottom end fitting. The helical shape of the ramp channels means that the lugs are drawn upwardly along the assembly axis. The movement of the seal plate causes the spring 22 to be compressed between the locating ring 222 which is fastened to the core tube and the radially inward most edge 224 of the seal plate 204. This can be seen from a comparison of FIGS. 3 and 4, and FIGS. 5 and 6.

The movement of the seal plate 204 causes the inwardly facing surface of the flange 200 which defines the socket 202 to engage and to compress inwardly the O-ring 120 which is provided in the groove 118 in the outer surface of the downwardly extending flange 116 on the bottom end fitting 114 of the filter element, so that a seal is formed between the bottom end fitting and the seal plate.

The movement of the valve member continues until the flow channels 211 in the wall of the core tube 212 overlap the flow channels 223 in the top segment 216 of the valve member 214 so that the valve which is provided by the two sets of flow channels is open.

A flow path exists for process fluid to flow from the cavity 110 within the filter element 110 to the cavity 219 within the core tube 212 when the valve is open as described above. The flow path for the process fluid includes the mesh of the filter mesh component which can help to separate from the process fluid droplets of liquid contaminant which is immiscible with the process fluid. The engagement of the continuous collar 126 on the mesh filter component 124 within the filter element with the axially extending circumferential outer surface of the top segment of the valve member, and with the shoulder 217 provided by the upper edge of the bottom segment of the valve sleeve, prevents a flow of the process fluid which by-passes the mesh filter component.

The O-ring 120 which is compressed between the inwardly facing surface of the flange 200 which defines the socket 202 and the outer surface of the downwardly extending flange 116 on the bottom end fitting 114 of the filter element, and the O-ring 208 which is compressed between the radially inwardly facing surface of the flange 200 which defines the socket 202 and the outer surface of the cylindrical wall 207 of the seal plate 204, prevent flow of process fluid from the cavity 110 within the filter element out of the filter assembly, other than through the port 15 in the mount 14.

Fluid in the cavity 209 within the core tube 212 can flow out of the core tube at its open end. A connection can be made between the open end of the core tube and a port on the lower part of the housing.

The filter element can be separated from the housing body by rotating the filter element relative to the housing body. This causes the valve member to slide relative to the core tube so that the flow channels in the wall of the core tube no longer overlap the flow channels in the top segment of the valve member. The valve provided by the valve member and the core tube is closed as a result, preventing flow of process fluid through the filter assembly.

The rotation of the filter element relative to the housing body allows the seal plate to slide towards the base wall of the mount, under the action of the spring in the annular chamber between the internal surface of the bottom segment of the valve member and the external surface of the core tube, so that the inwardly facing surface of the flange which defines the socket in the seal member is disengaged from the O-ring seal on the outer surface of the flange on the bottom end fitting of the filter element. The filter element can then be lifted out of the housing body.

The invention also provides a filter assembly having features which are specified in the following numbered clauses:

1. A filter assembly which comprises a filter element for filtering fluid, and a mount having at least one port, each of the filter element and the mount having interengaging connection formations by which the filter element and the mount can be detachably connected to one another, and the mount defining a flow path for fluid to flow between the port and the filter element when the filter element is connected to the mount, b. in which the filter element and the mount have cooperating sealing surfaces, the sealing surface on the mount being provided on a sealing part of the mount which can move into sealing engagement with the sealing surface on the filter element, c. and in which one of the filter element and the mount has at least one lug and the other of the filter element and the mount has a ramp surface, the lug engaging the ramp surface when the filter element and the mount are brought together along an assembly axis and a cam action between the lug and the ramp surface causing axial movement of the movable sealing part of the mount when the filter element is then rotated relative to the mount, to cause a seal to be made between the sealing surfaces.

2. The filter assembly according to clause 1, in which rotation of the filter element relative to the mount, when the filter element and the mount have been brought together, causes the sealing surfaces to be moved from a position where they are out of sealing contact to a position where they are in sealing contact.

3. The filter assembly according to either of clauses 1 or 2, in which the sealing surface on the filter element is provided by deformable sealing member.

4. The filter assembly according to any one of clauses 1 to 3, in which at least one of the mount and the movable sealing part can include a deformable sealing member which provides a seal between the mount and the movable sealing part.

5. The filter assembly according to any one of clauses 1 to 4, in which the mount includes a valve for controlling flow of fluid along the flow path, the valve including a valve member which can move between an open position in which fluid can flow along the flow path and a closed position in which the valve at least partially prevents flow of fluid along the flow path.

6. The filter assembly according to clause 5, in which the valve member is made to move between its open and closed positions when the movable sealing part of the mount moves into sealing engagement with the sealing surface on the filter element.

7. The filter assembly according to any one of clauses 1 to 6, in which the valve member and the movable sealing part of the mount are detachably connected to one another.

8. The filter assembly according to clause 7, in which one of the valve member and the movable sealing part has a flexible tang with a barb towards one end, and the other of the valve member and the movable sealing part has an opening in which the barbed end of the flexible tang can be received to connect the valve member and the movable sealing part to one another.

9. The filter assembly according to any one of clauses 1 to 8, in which the movable sealing part is biased towards the position from which it moves to form the seal with the sealing surface on the filter element.

The invention claimed is:

1. A filter assembly which comprises a filter element for filtering a fluid, and a mount having at least one port, each of the filter element and the mount having interengaging connection formations by which the filter element and the mount can be detachably connected to one another, and the mount defining a flow path for fluid to flow between the port and the filter element when the filter element is connected to the mount,
    in which the mount includes a valve for controlling flow of fluid along the flow path, the valve including a valve member which can move between an open position in which fluid can flow along the flow path and a closed position in which the valve at least partially prevents flow of fluid along the flow path,
    in which one of the filter element and the mount has at least one lug and the other of the filter element and the mount has a ramp surface, the lug engaging the ramp surface when the filter element and the mount are brought together along an assembly axis and a cam action between the lug and the ramp surface causing axial movement of the valve member when the filter element is then rotated relative to the mount,
    in which the filter element and the mount are arranged so that they are brought together by moving the filter element relative to the mount in a first direction along the assembly axis,
    and in which the lug and the ramp surface are arranged so that the valve member moves from the closed position to the open position in a second direction along the assembly axis, the second direction being opposite to the first direction.

2. The filter assembly as claimed in claim 1, in which at least part of the ramp surface extends approximately helically around the one of the filter elements and the mount which has the ramp surface.

3. The filter assembly as claimed in claim 1, in which opening of the valve is achieved by causing the valve member to move axially away from the mount.

4. The filter assembly as claimed in claim 3, in which the valve member is moved by rotating the filter element relative to the mount while the lug is engaged with the ramp surface, a shape of the ramp surface causing the lug to be drawn along the assembly axis.

5. The filter assembly as claimed in claim 1, in which the valve member is tubular and the valve includes a further member which is tubular, the tubular valve member and the further member being arranged coaxially so that one can slide relative to the other and each of the tubular valve member and the further member having at least one hole in its wall, and in which the hole in the wall of the valve member overlaps the hole in the wall of the further member when the valve is open.

6. The filter assembly as claimed in claim 5, in which the further member is fixed against movement relative to the mount when the valve member moves between its open and closed positions.

7. The filter assembly as claimed in claim 1, in which the lug is provided on the mount and the ramp surface is provided on the filter element.

8. The filter assembly as claimed in claim 1, in which the filter element and the mount have cooperating sealing surfaces, the sealing surface on the mount being provided on a sealing part of the mount which moves into sealing engagement with the sealing surface on the filter element when the valve member is made to move by the cam action between the lug and the ramp surface from its closed position towards its open position.

9. The filter assembly as claimed in claim 8, in which the sealing surface on the filter element is provided by a deformable sealing member.

10. The filter assembly as claimed in claim 8, in which the mount includes a deformable sealing member which provides a seal between the mount and the sealing part of the mount.

11. The filter assembly as claimed in claim 8, in which the valve member and the sealing part of the mount are detachably connected to one another.

12. The filter assembly as claimed in claim 11, in which one of the valve member and the movable sealing part has a flexible tang with a barb towards one end, and the other of the valve member and the movable sealing part has a recess in which the barbed end of the flexible tang can be received to connect the valve member and the sealing part of the mount to one another.

13. The filter assembly as claimed in claim 1, in which the valve member is biased towards its closed position.

14. A filter assembly which comprises a filter element for filtering a fluid, and a mount having at least one port, each of the filter element and the mount having interengaging connection formations by which the filter element and the mount can be detachably connected to one another, and the mount defining a flow path for fluid to flow between the port and the filter element when the filter element is connected to the mount, in which the mount includes a valve for controlling flow of fluid along the flow path, the valve including a valve member which can move between an open position in which fluid can flow along the flow path and a closed position in which the valve at least partially prevents flow of fluid along the flow path, in which one of the filter element and the mount has at least one lug and the other of the filter element and the mount has a ramp surface, the lug engaging the ramp surface when the filter element and the mount are brought together along an assembly axis and a cam action between the lug and the ramp surface causing axial movement of the valve member when the filter element is then rotated relative to the mount, in which the filter element and the mount are arranged so that they are brought together by moving the filter element relative to the mount in a first direction along the assembly axis, in which the lug and the ramp surface are arranged so that the valve member moves from the closed position to the open position in a second direction along the assembly axis, the second direction being opposite to the first direction, and in which opening of the valve is achieved by causing the valve member to move axially away from the mount.

15. A filter assembly which comprises a filter element for filtering a fluid, and a mount having at least one port, each of the filter element and the mount having interengaging connection formations by which the filter element and the mount can be detachably connected to one another, and the mount defining a flow path for fluid to flow between the port and the filter element when the filter element is connected to the mount, in which the mount includes a valve for controlling flow of fluid along the flow path, the valve including a valve member which can move between an open position in which fluid can flow along the flow path and a closed position in which the valve at least partially prevents flow of fluid along the flow path, in which one of the filter element and the mount has at least one lug and the other of the filter element and the mount has a ramp surface, the lug engaging the ramp surface when the filter element and the mount are brought together along an assembly axis and a cam action between the lug and the ramp surface causing axial movement of the valve member when the filter element is then rotated relative to the mount, in which the filter element and the mount are arranged so that they are brought together by moving the filter element relative to the mount in a first direction along the assembly axis, in which the lug and the ramp surface are arranged so that the valve member moves from the closed position to the open position in a second direction along the assembly axis, the second direction being opposite to the first direction, in which the filter element and the mount have cooperating sealing surfaces, the sealing surface on the mount being provided on a sealing part of the mount which moves into sealing engagement with the sealing surface on the filter element when the valve member is made to move by the cam action between the lug and the ramp surface from its closed position towards its open position, and in which the mount includes a deformable sealing member which provides a seal between the mount and the sealing part of the mount.

16. A filter assembly which comprises a filter element for filtering a fluid, and a mount having at least one port, each of the filter element and the mount having interengaging connection formations by which the filter element and the mount can be detachably connected to one another, and the mount defining a flow path for fluid to flow between the port and the filter element when the filter element is connected to the mount, in which the mount includes a valve for controlling flow of fluid along the flow path, the valve including a valve member which can move between an open position in which fluid can flow along the flow path and a closed position in which the valve at least partially prevents flow of fluid along the flow path, in which one of the filter element and the mount has at least one lug and the other of the filter element and the mount has a ramp surface, the lug engaging the ramp surface when the filter element and the mount are brought together along an assembly axis and a cam action between the lug and the ramp surface causing axial movement of the valve member when the filter element is then rotated relative to the mount, in which the filter element and the mount are arranged so that they are brought together by moving the filter element relative to the mount in a first direction along the assembly axis, in which the lug and the ramp surface are arranged so that the valve member moves from the closed position to the open position in a second direction along the assembly axis, the second direction being opposite to the first direction, in which the filter element and the mount have cooperating sealing surfaces, the sealing surface on the mount being provided on a sealing part of the mount which moves into sealing engagement with the sealing surface on the filter element when the valve member is made to move by the cam action between the lug and the ramp surface from its closed position towards its open position, and in which the valve member and the sealing part of the mount are detachably connected to one another.

17. A filter element for filtering a fluid, the filter element comprising:

cylindrical filter media circumscribing a central axis;

an annular end fitting at an end of the media, the end fitting having an inwardly-facing wall with an edge which defines a central opening around the central axis;

a first ramp surface along the wall of the end fitting for engaging connection formations of a mount of a filter assembly, by which the filter element and the mount can be detachably connected to one another along the central axis, the ramp surface extending approximately helically along an inner surface of the wall from the edge, further including first and second ribs along the inner surface of the wall, and extending along the wall from the edge, the ribs defining a ramp channel with a ramp opening along the edge of the wall, wherein one of the ribs of the ramp channel extends from a helical intersection with the edge of the wall on a first side of the opening to the channel, and the other of the ribs of the channel has a first, axial portion extending parallel with the central axis and intersecting the edge of the wall on a second side of the opening to the channel, and a second portion extending helically from the axial portion.

18. The filter element as claimed in claim 17, further including a second ramp surface extending approximately helically along the inner surface of the wall, wherein the first ramp surface is provided on the first rib, and the second ramp surface is provided on the second rib.

19. The filter element as claimed in claim 17, wherein at least a portion of the first and second ribs of the ramp channel extend in parallel relation to one another.

20. The filter element as claimed in claim 18, in which the edge of the inwardly-facing wall comprises a first surface portion adjacent the edge of the wall on the first side of the opening to the channel, and a second surface portion adjacent the edge of the wall on the second side of the opening to the channel.

21. The filter element as claimed in claim 17, in which a plurality of ramp channels are provided along the inner surface of the wall, each of the ramp channels have a ramp opening along the edge of the wall.

22. The filter element as claimed in claim 21, in which the ramp channels are spaced apart equally around the central opening in the end fitting.

23. The filter element as claimed in claim 17, wherein the end fitting includes a transverse plate and an annular flange projecting away from the transverse plate, the inwardly-facing wall being internal of the annular flange of the end fitting.

24. The filter element as claimed in claim 23, further including an O-ring supported on an external surface of the annular flange.

25. A filter element for filtering a fluid, the filter element comprising:

cylindrical filter media circumscribing a central axis;

an annular end fitting at an end of the media, the end fitting having an inwardly-facing wall with an edge which defines a central opening around the central axis;

ribs along the wall of the end fitting for engaging connection formations of a mount of a filter assembly, by which the filter element and the mount can be detachably connected to one another along the central axis, the ribs extending approximately helically along an inner surface of the wall, wherein the ribs include first and second ribs along the inner surface of the wall, and extending along the wall from the edge, the ribs defining a ramp channel with a ramp opening along the edge of the wall, wherein at least a portion of the first and second ribs of the ramp channel extend in parallel relation to one another, wherein one of the ribs of the ramp channel extends from a helical intersection with the edge of the wall on a first side of the opening to the channel, and the other of the ribs of the channel has a first, axial portion parallel to the central axis and intersecting the edge of the wall on a second side of the opening to the channel, and a second portion extending helically from the axial portion.

26. The filter element as claimed in claim 25, wherein the end fitting includes a transverse plate and an annular flange projecting away from the transverse plate, the inwardly-facing wall being internal of the annular flange of the end fitting.

27. The filter element as claimed in claim 26, further including an O-ring supported on an external surface of the annular flange.

* * * * *